(12) United States Patent
Servadio et al.

(10) Patent No.: US 10,518,716 B2
(45) Date of Patent: Dec. 31, 2019

(54) LOUDSPEAKER SYSTEM FOR VEHICLE

(71) Applicant: ASK INDUSTRIES SOCIETA' PER AZIONI, Monte San Vito (AN) (IT)

(72) Inventors: Maurizio Servadio, Monte San Vito (IT); Claudio Panni, Monte San Vito (IT); Pietro Massini, Ancona (IT); Enrico Esposito, Falconara Marittima (IT); Manrico Colonna, Monte San Vito (IT)

(73) Assignee: ASK INDUSTRIES SOCIETA' PER AZIONI, Monte San Vito (AN) (IT)

( * ) Notice: Subject to any disclaimer, the term of this patent is extended or adjusted under 35 U.S.C. 154(b) by 0 days.

(21) Appl. No.: 16/332,229

(22) PCT Filed: Sep. 13, 2017

(86) PCT No.: PCT/EP2017/073059
§ 371 (c)(1),
(2) Date: Mar. 11, 2019

(87) PCT Pub. No.: WO2018/050718
PCT Pub. Date: Mar. 22, 2018

(65) Prior Publication Data
US 2019/0232883 A1 Aug. 1, 2019

(30) Foreign Application Priority Data

Sep. 14, 2016 (IT) .................. 102016000092741

(51) Int. Cl.
*H04B 1/00* (2006.01)
*B60R 11/02* (2006.01)
(Continued)

(52) U.S. Cl.
CPC ........ *B60R 11/0217* (2013.01); *H04R 1/2811* (2013.01); *H04R 1/2876* (2013.01); *B60R 5/04* (2013.01); *B60R 2011/0029* (2013.01); *B60R 2011/0036* (2013.01); *H04R 1/023* (2013.01); *H04R 2499/13* (2013.01)

(58) Field of Classification Search
CPC .. B60R 11/0217; H04R 1/2811; H04R 1/2876
See application file for complete search history.

(56) References Cited

U.S. PATENT DOCUMENTS 4,493,389 A * 1/1985 Del Rosario ............ H04R 1/30
181/141
5,218,175 A * 6/1993 Scarlata .............. B60R 11/0217
181/141
(Continued)

*Primary Examiner* — Simon King
(74) *Attorney, Agent, or Firm* — Egbert. McDaniel & Swartz, PLLC

(57) ABSTRACT

A loudspeaker system for vehicle has a wall of a frame of a vehicle that separates an exterior from an interior and has a through hole, a box mounted in the wall in correspondence of the through hole, a loudspeaker mounted in the box, a back resonance chamber formed between the membrane of the loudspeaker and the walls of the box, a through hole obtained in a wall of the box and disposed in register with the hole of the wall of the frame of the vehicle and a partition of sound-absorbing material that closes the through hole of the wall of the box.

8 Claims, 6 Drawing Sheets

(51) Int. Cl.
*H04R 1/28* (2006.01)
*B60R 5/04* (2006.01)
*H04R 1/02* (2006.01)
*B60R 11/00* (2006.01)

(56) References Cited

U.S. PATENT DOCUMENTS

| | | | |
|---|---|---|---|
| 5,394,478 A * | 2/1995 | Hathaway | H04R 1/2842 181/160 |
| 2005/0111673 A1* | 5/2005 | Rosen | B60R 11/0217 381/89 |
| 2012/0219171 A1* | 8/2012 | Velican | H04R 1/22 381/353 |
| 2018/0020290 A1* | 1/2018 | Ludwig | B60R 11/0217 |

* cited by examiner

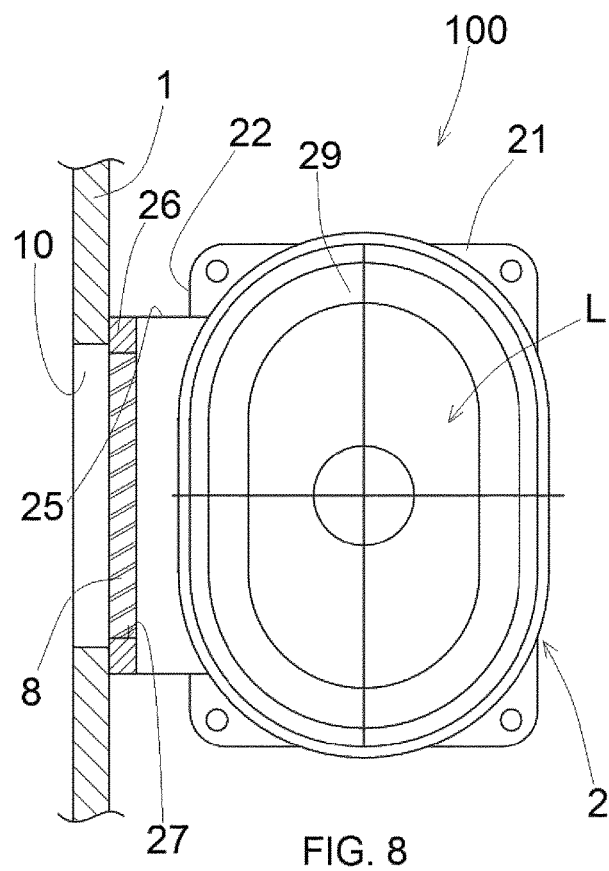
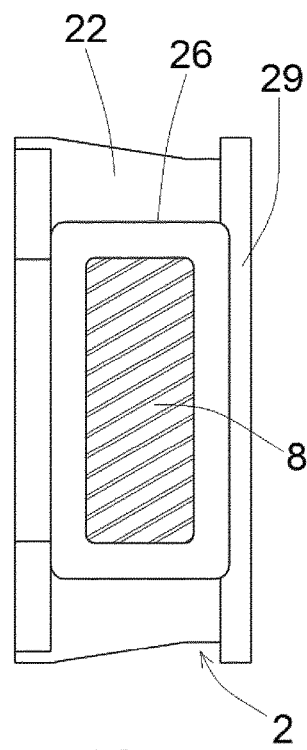
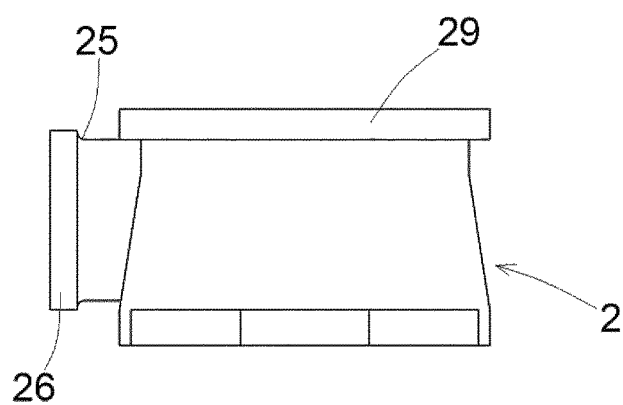
FIG. 8
FIG. 10
FIG. 9

LOUDSPEAKER SYSTEM FOR VEHICLE

The present patent application for industrial invention relates to a loudspeaker system for vehicle.

As it is known, a speaker system comprises a loudspeaker and a compartment, generally known as "box". The speaker comprises a basket, a membrane, a magnetic unit, a voice coil and elastic centering and suspension means (centering device and edge).

The magnetic unit generates a static magnetic field. Electrical current circulates in the coil. By interacting with the electrical current that circulates in the coil, the static magnetic field caused by the magnetic unit generates a force on the coil that puts the membrane in vibration and the membrane generates a sound.

The main function of the box is to eliminate the so-called "acoustic short circuit" that reduces the sound pressure level (SPL). The lower the frequency of the sound emitted by the loudspeaker, the higher such a reduction will be.

Boxes with volumes from 2 to 50 liters are typically used for the interior of vehicles. Normally, in order to tune the project of the speaker system, the volume of the box and the construction parameters of the loudspeaker are modified. The higher the volume of the box, the better the performance of the loudspeaker at low frequencies will be. Both the frequency extension and the transient response can be modified by changing the construction parameters of the loudspeaker.

Applications of loudspeakers to vehicles are known, which use volumes obtained in the vehicle as boxes of the loudspeaker.

EP0904985 discloses a loudspeaker disposed in a compartment under the passenger seat. Such a loudspeaker uses the interior of the vehicle as box.

WO2007/036245 discloses a loudspeaker disposed in a specific position of the vehicle in such a way to use two internally empty elements of the vehicle that meet one another, in such a way to form two resonance chambers that are coupled together.

WO2011/047435 discloses a loudspeaker assembly that provides for a loudspeaker mounted in a wall of a vehicle. The loudspeaker assembly has a Helmholtz resonator that comprises a chamber in communication with a vent duct. The volume of the chamber of the Helmholtz resonator is smaller than the volume of the loudspeaker driver to provide a system frequency that is higher than the operation band of the loudspeaker driver.

EP2620328 discloses a system comprising: a loudspeaker installed in the trunk of a vehicle, a sound guide port that sends the sound in the interior of the vehicle and an air vent port that ends in front of the water box of the vehicle.

Documents EP0904985 and WO2007/036245 have some limitations in the tuning of the frequency response of the loudspeaker system.

Documents WO2011/047435 and EP2620328 are impaired by some drawbacks caused by the structural complexity of the ducts connected to chambers obtained in the loudspeaker to generate the Helmholtz resonators.

EP2779695 discloses a wall of a vehicle that separates the interior from the exterior (infinite baffle type). The loudspeaker comprises a hermetically closed basket (without openings). A box is composed of the basket and of a duct in communication with a hole of the wall. In such a way a back chamber is formed between the membrane of the loudspeaker and the box. The magnetic unit is outside the box. Such a solution is impaired by drawbacks related with volume, compact design and versatility. In fact, the magnetic unit is outside the box and the basket of the loudspeaker must be hermetically closed, thus excluding the use of open standard baskets. The provision of the air vent port in the proximity of the membrane increases the instability of the mobile coil. In fact, such a port is an asymmetric acoustic load, and causes a deviation from the axial movement of the mobile coil. This increases the risk for the mobile coil to hit the polar extensions of the magnetic circuit, causing undesired noise.

U.S. Pat. No. 6,338,395 discloses a loudspeaker disposed in a box filled with sound-absorbing material. Such a document doesn't teach to couple the box to a wall of a vehicle that forms an infinite baffle; likewise, it doesn't teach to position the sound-absorbing material only in the outlet hole of the box.

The purpose of the present invention is to eliminate the drawbacks of the prior art by disclosing a loudspeaker system for vehicle that is effective, efficacious, reliable, accurate and simple to make and install.

These purposes are achieved according to the invention with the characteristics of the independent claim 1.

Advantageous embodiments of the invention appear from the dependent claims.

The loudspeaker system for vehicle according to the present invention comprises:
  a wall of a frame of a vehicle that separates an exterior from an interior;
  said wall having a through hole,
  a box mounted in the wall in correspondence of the through hole of the wall and facing inwards,
  a loudspeaker mounted in the box; said loudspeaker comprising a basket fixed to the box, a magnetic unit fixed to the basket, a coil supported by a cylinder connected to a membrane and a centering device and border that connect the cylinder to the basket and the membrane to the basket,
  a back resonance chamber formed between said membrane of the loudspeaker and the walls of the box,
  a through hole obtained in a wall of the box and disposed in register with said hole of the wall of the frame of the vehicle; said through hole of the wall of the box being in communication with said back resonance chamber.

The basket and the magnetic unit are disposed inside said box in said back resonance chamber.

The basket is open and is provided with openings intended to let air pass in said back resonance chamber.

A partition of sound-absorbing material is disposed and fills said through hole of the wall of the box.

The fact that the basket and the magnetic unit are disposed inside the box makes the loudspeaker more compact and capable of being easily and rapidly fixed to the wall of the frame of the vehicle. The basket of the loudspeaker is a traditional basket that is open to let air pass in the back resonance chamber. Moreover, the fact that the basket and the magnetic unit are disposed inside the box permits to better contrast the noise caused by the air turbulence when the membrane makes its maximum travel.

The sound-absorbing material is disposed only in the outlet hole of the box because such a position has the highest air speed and the best results are obtained, without having to entirely fill the box with sound-absorbing material, and avoiding the waste of said material. Moreover, the mechanical damping factor of the loudspeaker is modified considerably by placing the sound-absorbing material only in the outlet hole of the box.

Additional features of the invention will appear clearer from the detailed description below, which refers to merely illustrative, not limiting embodiments, wherein:

FIG. 8 is a plan view of a variant of the loudspeaker system of FIG. 6;

FIG. 9 is a front view of the box of the loudspeaker system of FIG. 8;

FIG. 10 is a side view of the box of the loudspeaker system of FIG. 8;

Figure 1:
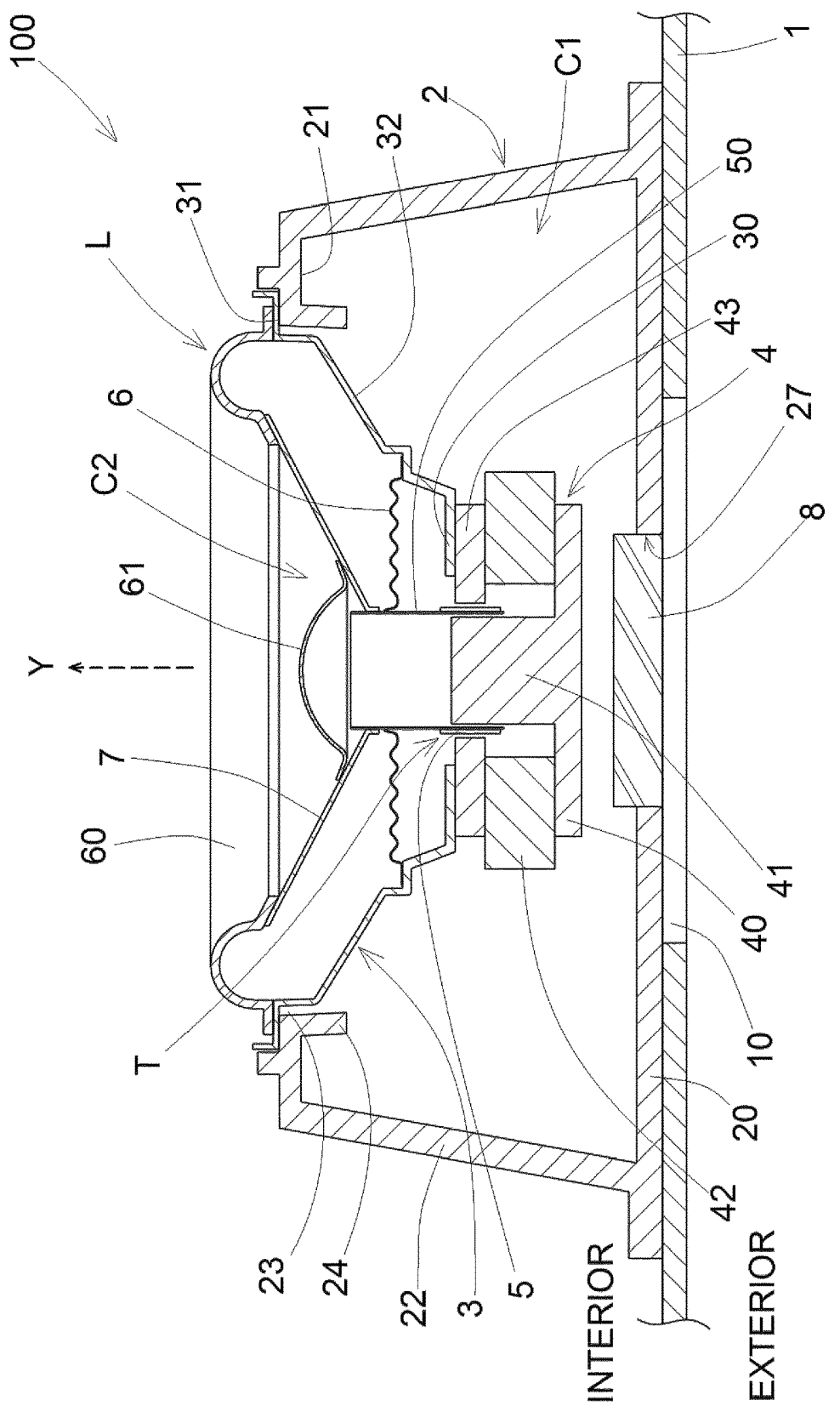
FIG. 1 is a sectional view of the loudspeaker system for vehicle according to the invention.

With reference to the Figures, the loudspeaker system of the invention is described, which is generally indicated with reference numeral 100.

With reference to FIG. 1, the system (100) comprises a wall (1) of a frame of a vehicle that separates an exterior from an interior of the vehicle. The interior of the vehicle can be the driver and passenger compartment or a compartment of the vehicle in communication with the driver and passenger compartment of the vehicle or adjacent to it. The wall (1) of the frame of the vehicle has a through hole (10).

A box (2) is mounted in the wall (1) in correspondence of the through hole (10) of the wall. The box (2) is facing inwards. A loudspeaker (L) is mounted in the box (2). The box (2) coupled with the wall (1) of the vehicle forms a loudspeaker system of infinite baffle type.

The box (2) comprises a bottom wall (20), an upper wall (21) and lateral walls (22) that connect the bottom wall (20) to the upper wall (21).

The upper wall (21) is provided with an opening (23) intended to receive the loudspeaker (L).

The loudspeaker (L) comprises a basket (3) provided with a lower wall (30) that radially protrudes towards the interior of the basket, an upper wall (31) that radially protrudes towards the exterior of the basket and a lateral wall (32) that connects the lower wall to the upper wall. The basket (3) substantially has a truncated-conical shape with increasing diameter going from the lower wall to the upper wall. The lateral wall (32) of the basket is provided with openings to let air pass through. The basket (3) is an open basket of standard type that is commonly used in loudspeakers.

The upper wall (31) of the basket is fixed to the upper wall (21) of the box, in such a way that the basket passes through the opening (23) of the box and is contained in the box.

A magnetic unit (4) is fixed to the basket (3). The magnetic unit (4) comprises:

- a lower polar plate (40) (T-Yoke), with T-shaped cross-section, comprising a cylindrical core (41) that protrudes axially from the plate,
- a permanent magnet (42) with toroidal shape, disposed on the lower polar plate, around a cylindrical core (41), and
- an upper polar plate (43), with toroidal shape, disposed on the permanent magnet (42).

In view of the above, an air gap (T) is formed between the upper polar plate (43) and the core (41).

A coil (5) is supported by a cylinder (50).

A centering device (6), which is composed of elastic corrugations, is fixed to the basket (3) and to the cylinder (50) of the coil, in such a way to center and support the coil (5) in the air gap (T).

A truncated-conical membrane (7) is centrally fixed to the cylinder (50) of the coil.

An edge (60), in the form of an elastic suspension, is peripherally fixed to the membrane (7) and to the upper wall (31) of the basket, in such a way that the membrane (7) has a truncated-conical shape with increasing diameter going from the cylinder of the coil towards the upper wall of the basket.

A covering element (61), which is known as "dustcap", is centrally disposed on the membrane (7) in such a way to cover the cylinder of the coil.

The loudspeaker (L) has an axis (Y) that coincides with the axis of the cylinder (50).

When the static magnetic field in the air gap (T), which is generated by the magnetic unit (4), interacts with the electrical current that flows in the coil (5), a force is generated on the coil. Such a force axially moves the cylinder (50) of the coil and makes the membrane (7) vibrate, with consequent sound emission.

In the embodiment of FIG. 1, the bottom wall (20) of the box is fixed to the wall (1) of the frame of the vehicle. The lower wall (20) has a hole (27) with a substantially circular shape.

A back resonance chamber (C1) is formed in the box (2), being defined by the walls of the box, by the membrane (7) and by the edge (60). Such a back resonance chamber (C1) is in communication with the exterior by means of the hole (27) obtained in the lower wall of the box. Therefore the back resonance chamber (C1) and the hole (27) act as Helmholtz's resonator.

Both the basket (5) and the magnetic unit (4) are disposed inside the box (2) and contained inside the back resonance chamber (C1). The basket (3) must be open to let air pass through.

Nevertheless, it must be considered that the volume of the back resonance chamber (C1) is larger than a front volume (C2) formed by the truncated-conical volume of the membrane (7).

In order to obtain a frequency band with a higher low frequency width compared to the frequency band of the loudspeaker mounted in a closed box with typical volume, the hole (27) of the flange of the box is provided with a partition (8) with variable thickness made of sound-absorbing material, such as for example agglomerates of natural fibers, synthetic fibers or open-cell foam.

The main function of the partition (8) is to modify the frequency response and the transient response of the loudspeaker system by acoustic power dissipation in function of frequency. Said frequency responses are controlled by changing the geometry and the material of the partition (8).

The additional and necessary function of the partition (8) is to protect the loudspeaker against weather agents and the intrusion of foreign matter (dust, sand, stones, etc.). The partition (8) has a thickness comprised between 0.1 and 40 mm.

In FIG. 1 the hole (27) has an axis that coincides with the axis (Y) of the loudspeaker. Nevertheless, the hole (27) may have an axis that does not coincide with the axis (Y) of the loudspeaker.

Figure 2:
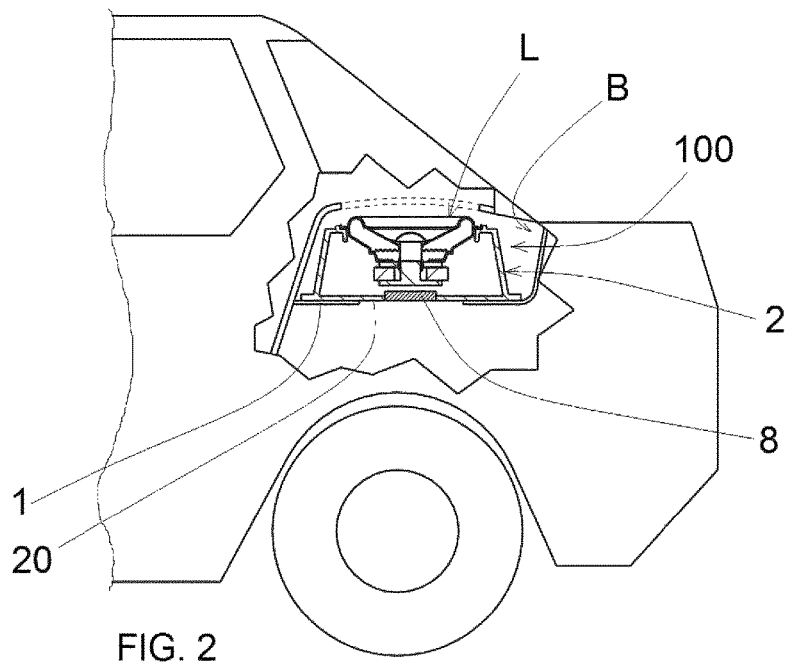
FIG. 2 is a partially cut and interrupted side view of a vehicle and of the loudspeaker system of FIG. 1 installed in an upper part of a trunk of the vehicle.
Figure 3:
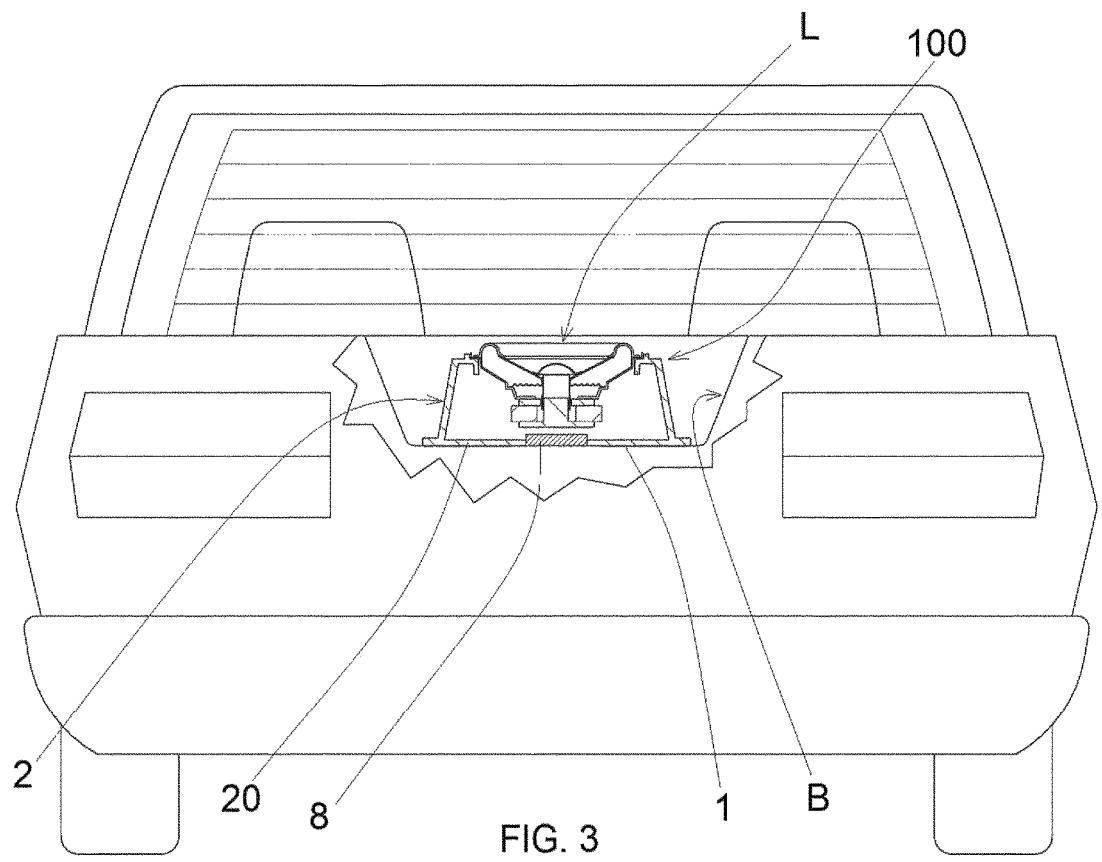
FIG. 3 is a partially cut rear view of the vehicle of FIG. 2.

FIGS. 2 and 3 show an embodiment wherein the system (100) is mounted in an upper part of a trunk (B) of a vehicle. In such a case, the wall (1) of the vehicle where the box (2) is mounted is a wall disposed in the upper part of the trunk (B) of the vehicle. The box (2) is mounted on a substantially horizontal wall (1) and consequently the axis of the loudspeaker is substantially vertical.

Figure 4:
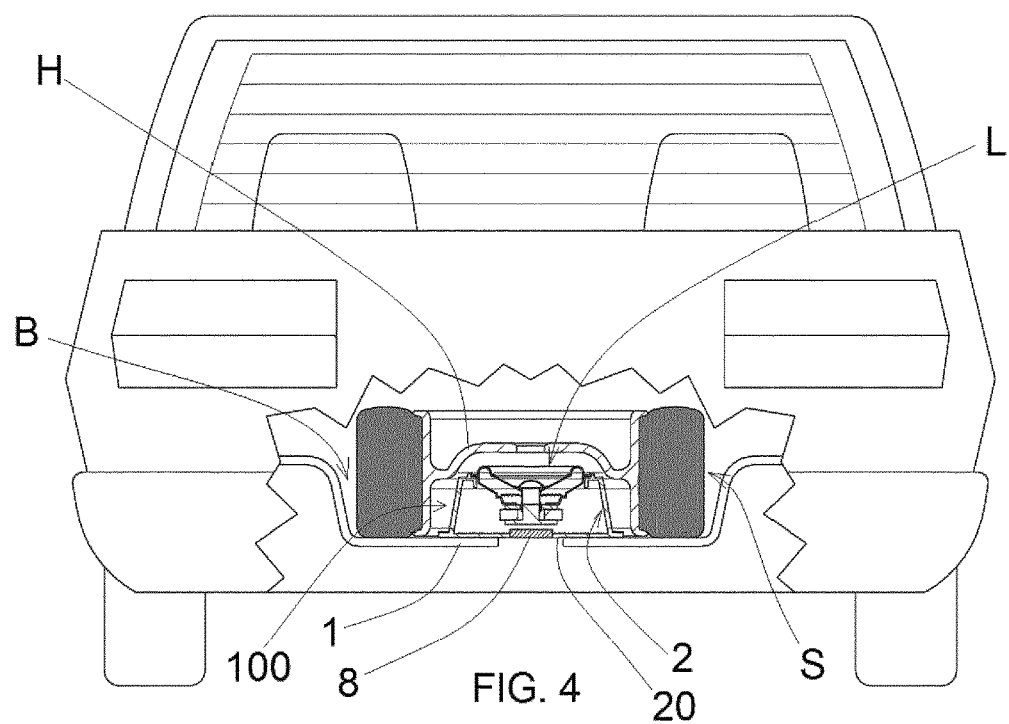
FIG. 4 is a partially cut rear view of a vehicle and of the loudspeaker system of FIG. 1 installed in a lower part of a trunk of the vehicle under a spare tire.

FIG. 4 shows an embodiment wherein the system (100) is mounted in a lower part of a trunk (B) of a vehicle, where a spare tire (S) is generally positioned. In such a case the wall (1) of the vehicle where the box (2) is mounted is a bottom wall of the trunk (B) of the vehicle and the box (2) is disposed between the bottom wall (11) of the trunk and the hub (H) of the spare tire.

Figure 5:
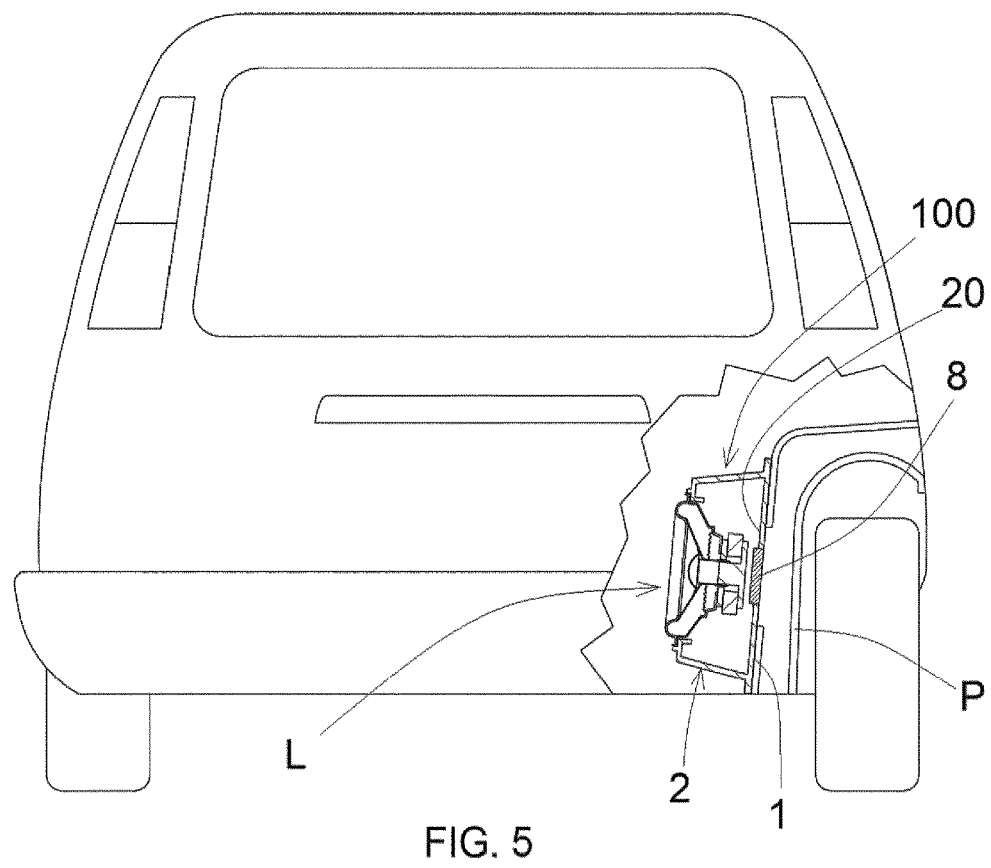
FIG. 5 is a partially cut rear view of a vehicle and of the loudspeaker system of FIG. 1 installed in a side part of the vehicle.

FIG. 5 shows an embodiment wherein the system (100) is mounted in a wall (1) of the vehicle, near a fender (P) of the vehicle. In such a case, the box (2) is mounted on a substantially vertical wall (1) and consequently the axis of the loudspeaker is substantially horizontal.

In the following description the parts that are identical or corresponding to the parts described above are identified with the same numerals, omitting their detailed description.

Figure 6:
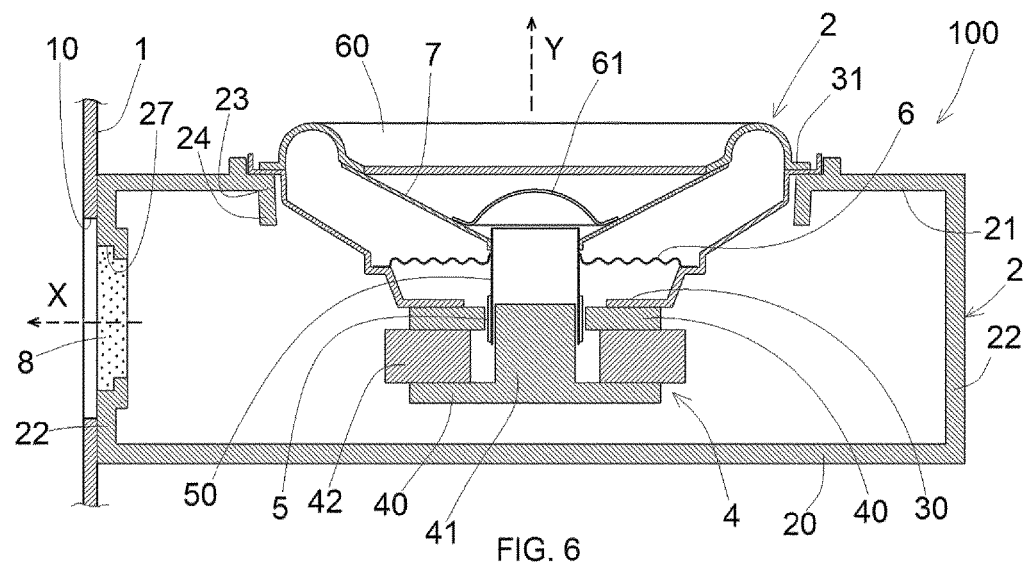
FIG. 6 is a sectional view of a variant of the loudspeaker system of FIG. 1.
Figure 7:
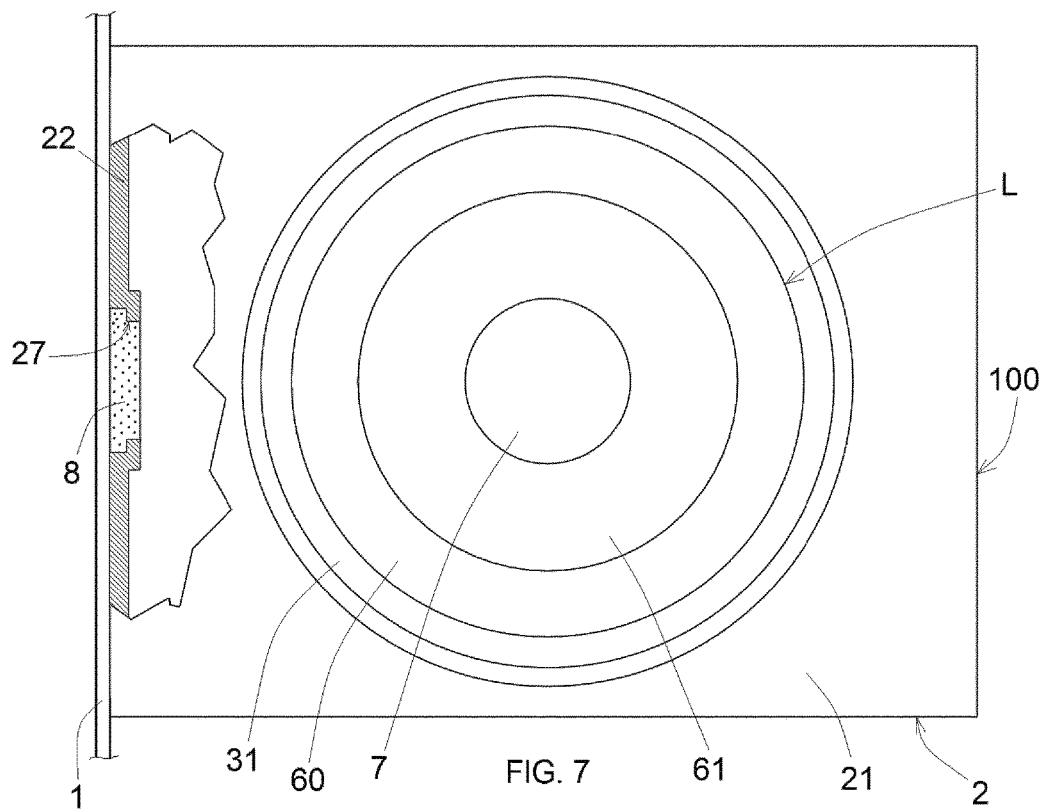
FIG. 7 is a partially cut top view of the loudspeaker system of FIG. 6.

FIGS. 6 and 7 show a variant of the system (100), wherein the hole (27) that receives the partition (8) of sound-absorbing material is disposed in a lateral wall (22) of the box.

In such a case, the hole (27) of the box has an axis (X) orthogonal to the axis (Y) of the loudspeaker (L) and substantially passing through the end of the core (41) of the magnetic unit.

FIGS. 8 and 10 show a variant of the system (100), wherein the hole (27) that receives the partition (8) of sound-absorbing material is disposed in a duct (25) that protrudes laterally from a lateral wall (22) of the box. The hole (27) has a rectangular shape. The duct (25) ends with a flange (26) that is fixed to the wall (1) of the frame of the vehicle. A grill (29) is disposed on the front wall of the box, in such a way to cover the loudspeaker (L) disposed in the box.

Although not shown in the figures, the front wall (21) of the box may be sufficiently large with respect to the loudspeaker (L). In such a case the hole (27) that receives the partition (8) may be obtained in the front wall (21) of the box.

Figure 11:
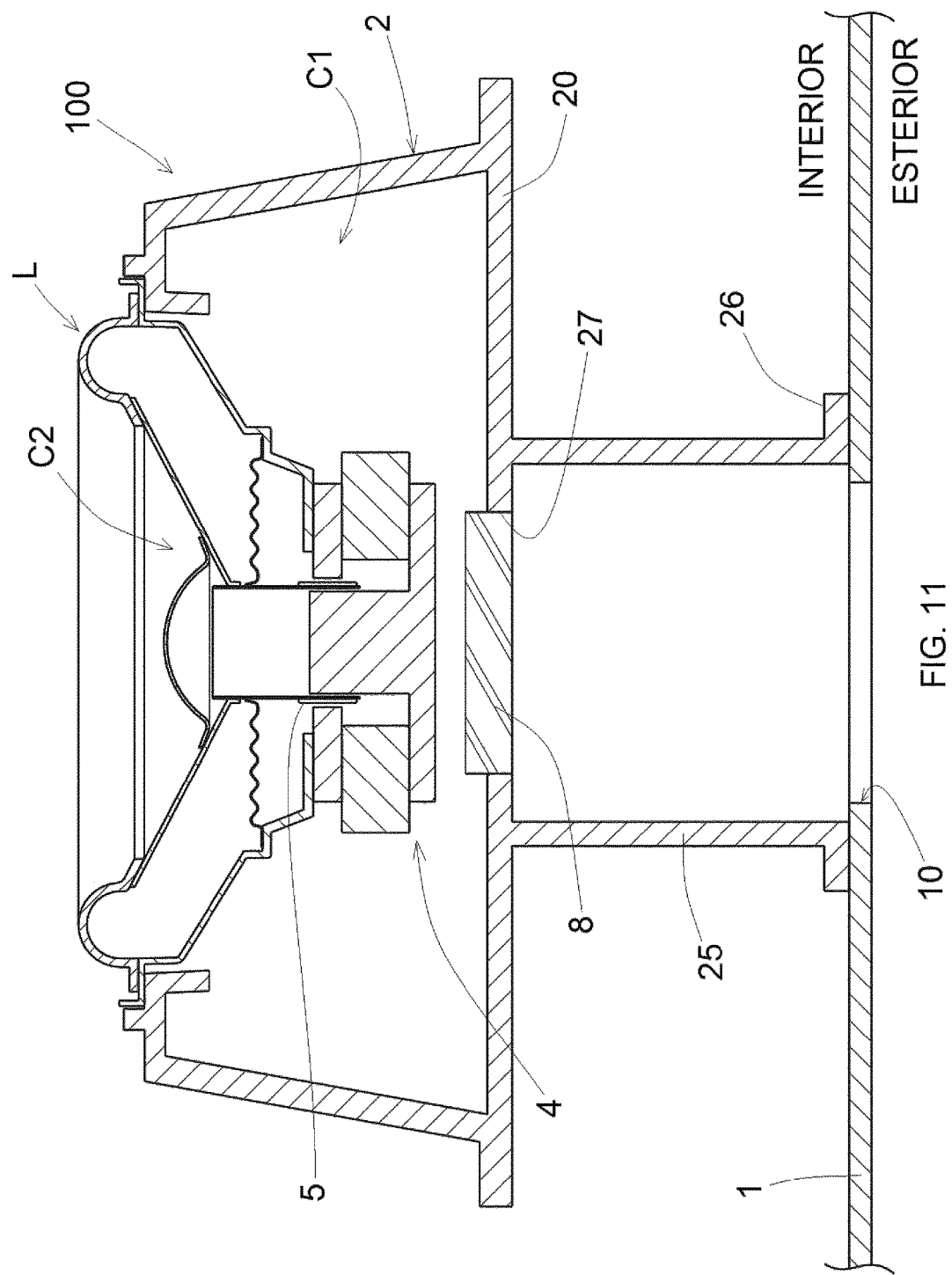
FIG. 11 is an axial view of a variant of the loudspeaker system according to the invention.

FIG. 11 shows a variant of the system (100), wherein the back wall (20) of the box is not directly fixed to the wall (1) of the frame. In fact, a connection pipe or duct (25) protrudes in the back from the back wall (20) of the box, around the hole (27) that receives the partition (8) for fixing to the wall (1) of the frame. In such a case, the duct (25) has a flange (26) for fixing to the wall of the frame.

A number of changes may be made to the present embodiments of the invention, all within the reach of an expert in the field, without departing from the scope of the invention.

The invention claimed is:

1. Loudspeaker system for vehicle comprising:
   a wall of a frame of a vehicle that separates an exterior from an interior; said wall having a through hole,
   a box mounted in the wall in correspondence of the through hole of the wall and facing inwards,
   a loudspeaker mounted in the box; said loudspeaker comprising a basket fixed to the box, a magnetic unit fixed to the basket, a coil supported by a cylinder connected to a membrane and centering devices that connect the cylinder to the basket and the membrane to the basket,
   a back resonance chamber formed between said membrane of the loudspeaker and the walls of the box,
   a through hole obtained in a wall of the box and disposed in register with said hole of the wall of the frame of the vehicle; said through hole of the wall of the box being in communication with said back resonance chamber, and
   characterized in that
   said basket and said magnetic unit are disposed inside a box, in said back resonance chamber,
   said basket is open and is provided with openings intended to let air pass in said back resonance chamber,
   a partition of sound-absorbing material is provided and fills said through hole of the wall of the box.

2. The system of claim 1, wherein said partition is made of an agglomerate of natural fibers, synthetic fibers and/or open-cell foams.

3. The system of claim 1, wherein said membrane of the loudspeaker has a truncated-conical shape and defines a front truncated-conical volume, wherein the volume of said back resonance chamber is higher than said front volume.

4. The system of claim 1, wherein
   said basket of the loudspeaker is fixed to a front wall of the box; and
   said through hole of the box is obtained in a back wall of the box.

5. The system of claim 4, wherein said through hole of the back wall of the box has an axis that coincides with the axis (Y) of the loudspeaker.

6. The system of claim 1, wherein
   said basket of the loudspeaker is fixed to a front wall (21) of the box;
   said through hole of the box is obtained in a lateral wall of the box;
   said through hole of the wall of the box has an axis (X) orthogonal to the axis (Y) of the loudspeaker.

7. The system of claim 1, wherein
   said basket of the loudspeaker is fixed to a front wall of the box; and
   said through hole of the box is obtained in said front wall of the box.

8. The system of claim 1, comprising a connection pipe or duct that externally protrudes from the wall of the box, around the hole that receives the partition for fixing to the wall of the frame.

* * * * *